United States Patent
Schmitz et al.

(10) Patent No.: US 10,896,553 B2
(45) Date of Patent: Jan. 19, 2021

(54) VEHICLE ANOMALOUS BEHAVIOR DETECTION

(71) Applicant: THE BOEING COMPANY, Chicago, IL (US)

(72) Inventors: Jeffrey A. Schmitz, Saint Charles, MO (US); Eric L. Nicks, Defiance, MO (US); John Boggio, Columbia, IL (US); Liessman Sturlaugson, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 353 days.

(21) Appl. No.: 15/938,490

(22) Filed: Mar. 28, 2018

(65) Prior Publication Data

US 2019/0304206 A1 Oct. 3, 2019

(51) Int. Cl.
| | | |
|---|---|---|
| *G07C 5/00* | (2006.01) | |
| *B60Q 9/00* | (2006.01) | |
| *G07C 5/08* | (2006.01) | |
| *G06Q 10/00* | (2012.01) | |

(52) U.S. Cl.
CPC ............ *G07C 5/006* (2013.01); *B60Q 9/00* (2013.01); *G06Q 10/00* (2013.01); *G07C 5/0808* (2013.01)

(58) Field of Classification Search
CPC ...... G07C 5/006; G07C 5/0808; G06Q 10/00; G06Q 10/20; B60Q 9/00; G08B 21/24
See application file for complete search history.

(56) References Cited

U.S. PATENT DOCUMENTS

| | | |
|---|---|---|
| 7,702,435 B2 | 4/2010 | Pereira et al. |
| 8,452,475 B1 | 5/2013 | West et al. |
| 9,633,489 B2 | 4/2017 | Schmitz et al. |

(Continued)

FOREIGN PATENT DOCUMENTS

| | | |
|---|---|---|
| CN | 102483836 A | 5/2012 |
| EP | 2801937 A1 | 11/2014 |

(Continued)

OTHER PUBLICATIONS

European Search Report for Application No. 19162383.4 dated Apr. 25, 2019, 4 pgs.

(Continued)

*Primary Examiner* — Thomas Ingram
(74) *Attorney, Agent, or Firm* — Moore IP Law

(57) ABSTRACT

A vehicle includes a first system, a first sensor, a second sensor, and a processor. The first sensor is configured to generate first sensor data indicative of an operational status of the first system. The second sensor is configured to generate second sensor data associated with an adaptive performance metric adjustment criterion. The processor is configured to, in response to determining that the second sensor data satisfies the adaptive performance metric adjustment criterion, determine, based on the second sensor data, an adaptive performance metric to be compared to the first sensor data to identify anomalous behavior of the first system. The processor is further configured to compare the first sensor data to the adaptive performance metric and to generate a maintenance alert in response to determining that the first sensor data fails to satisfy the adaptive performance metric.

20 Claims, 3 Drawing Sheets

(56) References Cited

U.S. PATENT DOCUMENTS

2006/0229851 A1* 10/2006 Cannon ............... G07C 5/008
                                                                         702/193
2014/0188576 A1* 7/2014 de Oliveira ...... G06Q 10/06395
                                                                         705/7.39

FOREIGN PATENT DOCUMENTS

| EP | 3287860 A1 | 2/2018 |
| RU | 2015126649 A | 2/2017 |
| WO | 2017176550 A1 | 10/2017 |

OTHER PUBLICATIONS

Communication pursuant to Article 94(3) EPC for Application No. 19162383.4 dated Jan. 20, 2020, 6 pgs.
"Rolls-Royce launches IntelligentEngine," Rolls Royce, Feb. 5, 2018, <https://www.rolls-royce.com/media/press-releases/yr-2018/05-02-2018-rr-launches-intelligentengine.aspx#latest-updates>, pp. 1-3.
Communication pursuant to Article 94(3) EPC for application No. 19162383.4 dated May 15, 2019, 6 pgs.
Communication pursuant to Article 94(3) EPC for application No. 19162383.4 dated Nov. 12, 2020, 7 pgs.

* cited by examiner

VEHICLE ANOMALOUS BEHAVIOR DETECTION

FIELD OF THE DISCLOSURE

The present disclosure is generally related to vehicle anomalous behavior detection.

BACKGROUND

Maintenance and fault detection limits (or thresholds) are generally based on vehicle type (e.g., model or build out) across an entire fleet. As an example of such a maintenance limit, an engine air filter of every aircraft of a particular type in a fleet may be changed annually (based on a service time threshold of one year for the engine air filter). As an example of such a fault detection limit, a fault threshold for the engine air filter may be set at a particular pressure drop for every aircraft of the particular type across the fleet.

Usually, such limits are established assuming a worst-case operating environment of the vehicles in the fleet or an average operating environment of the vehicles in the fleet, and do not account for individual vehicle conditions. For most of the vehicles in the fleet, the maintenance and fault detection limits based on the worst-case operating environment will be overly-conservative, resulting in higher maintenance costs than necessary. However, the maintenance and fault detection limits based on the average operating environment of the vehicles in the fleet may not be suitable for vehicles that operate in an operating environment that differs from (e.g., is better or worse than) the expected (e.g., average-case or worst-case) operating environment.

SUMMARY

In a particular implementation, a vehicle includes a first system, a first sensor, a second sensor, a memory, and a processor. The first system is of a first system type, and the first sensor is configured to generate first sensor data indicative of an operational status of the first system. The second sensor is configured to generate second sensor data associated with an adaptive performance metric adjustment criterion. The memory is configured to store the first sensor data and the second sensor data during one or more operational periods of the vehicle. The processor is configured to determine whether the second sensor data satisfies the adaptive performance metric adjustment criterion. The processor is also configured to, in response to determining that the second sensor data satisfies the adaptive performance metric adjustment criterion, determine, based on the second sensor data, an adaptive performance metric to be compared to the first sensor data to identify anomalous behavior of the first system. The processor is further configured to compare the first sensor data to the adaptive performance metric and to generate a maintenance alert in response to determining that the first sensor data fails to satisfy the adaptive performance metric.

In another particular implementation, a method includes receiving, at a device from a first sensor, first sensor data indicative of an operational status of a first system of a first system type. The method also includes receiving, at the device from a second sensor, second sensor data associated with an adaptive performance metric adjustment criterion. The method further includes determining, at the device, whether the second sensor data satisfies the adaptive performance metric adjustment criterion. The method also includes, based on determining that the second sensor data satisfies the adaptive performance metric adjustment criterion, determining an adaptive performance metric based on the second sensor data. The method further includes comparing, at the device, the first sensor data to the adaptive performance metric to identify anomalous behavior of the first system and generating a maintenance alert at the device based on determining that the first sensor data fails to satisfy the adaptive performance metric.

In another particular implementation, a computer-readable storage device stores instructions that, when executed by a processor, cause the processor to perform operations including receiving, from a first sensor, first sensor data indicative of an operational status of a first system of a first system type. The operations also include receiving, from a second sensor, second sensor data associated with an adaptive performance metric adjustment criterion. The operations further include determining whether the second sensor data satisfies the adaptive performance metric adjustment criterion. The operations also include, based on determining that the second sensor data satisfies the adaptive performance metric adjustment criterion, selectively determining an adaptive performance metric based on the second sensor data. The operations further include comparing the first sensor data to the adaptive performance metric to identify anomalous behavior of the first system and generating a maintenance alert based on determining that the first sensor data fails to satisfy the adaptive performance metric.

The features, functions, and advantages described herein can be achieved independently in various implementations or may be combined in yet other implementations, further details of which can be found with reference to the following description and drawings.

DETAILED DESCRIPTION

Figure 1:
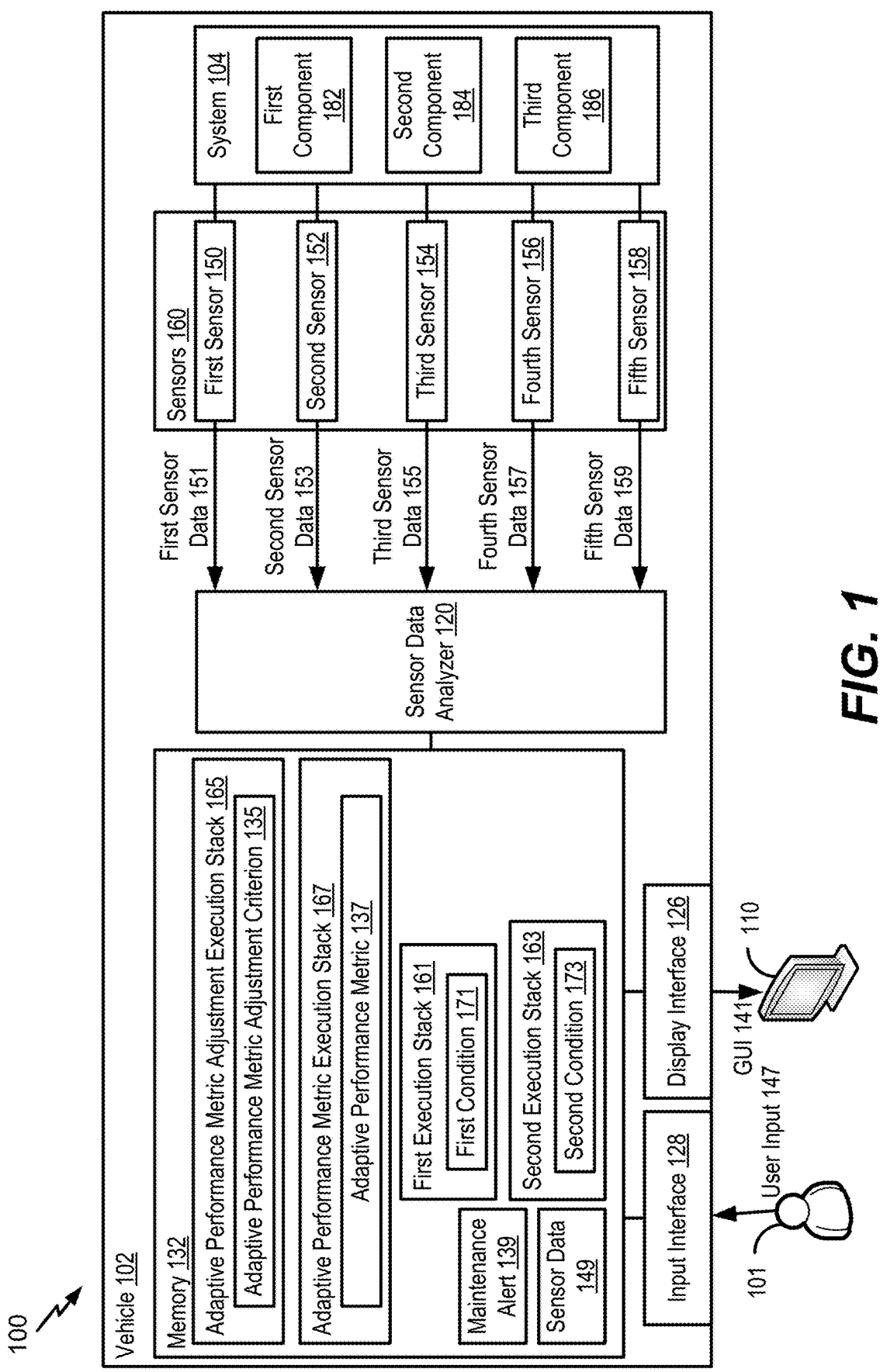
FIG. 1 is a block diagram that illustrates a system operable to detect anomalous behavior in a vehicle.

Implementations described herein are directed to vehicle anomalous behavior detection. A vehicle includes a first system and a plurality of sensors. For example, the vehicle can include at least one of an aircraft, a boat, a truck, a train, or a car. In this example, the first system can include an air conditioning system, a braking system, an actuator, a charging system, an engine, a starting system, or another system of the vehicle. The plurality of sensors include a first sensor (or a plurality of first sensors) configured to generate first sensor data indicative of an operational status of the first system. For example, the first sensor may directly or indirectly measure a parameter indicative of a state of the first system (e.g., whether the first system is on, off, open, closed, etc.). The plurality of sensors also include a second sensor (or a plurality of second sensors) configured to generate second sensor data used to select or determine an adaptive performance metric for the first system. For example, the second sensor may directly or indirectly measure a parameter that is used to change or adapt the adaptive performance metric based on a condition specific to the vehicle. Thus, while a fleet of vehicles may initially all use the same performance metric(s) to identify anomalous behavior, as conditions change and as the vehicles operate in different environments, the second sensor data varies from vehicle to vehicle within the fleet, resulting in different adaptive performance metrics being used to detect anomalous behavior associated with different vehicles of the fleet. To illustrate, in a particular implementation, the first system includes an actuator, the first sensor data indicates a measured time to open the actuator, and the second sensor data indicates a count of transitions of the actuator from a closed state to an open state, an average time to open the actuator, and hours of operation of the actuator. In this implementation, the adaptive performance metric is changed after a specific number of transitions of the actuator. Thus, while every vehicle in the fleet may initially use an actuator open time threshold to detect anomalous behavior of the actuator, after a period of time one vehicle may have used the actuator significantly more frequently than another vehicle of the fleet. The adaptive performance metric of the vehicle that has used the actuator more frequently may be updated, resulting in different performance metrics being used by different vehicles of the fleet. Such adaptation of the performance metric avoids use of overly conservative performance metrics (such as performance metrics based on worst-case operating conditions), while at the same time avoiding use of performance metrics that do not provide sufficient margins (such as performance metrics based on average operating conditions). As a result, the operation and maintenance of each vehicle of the fleet is individualized, resulting in improved uptime for vehicles of the fleet that typically operate in less severe conditions than the worst-case operating conditions and resulting in improved fault detection for vehicles of the fleet that typically operate in more severe conditions than the average operating conditions for the fleet.

To enable use of an adaptive performance metric, a memory accessible by (e.g., communicatively coupled to) the vehicle includes the adaptive performance metric and an adaptive performance metric adjustment criterion. For example, the adaptive performance metric is based on a default value, a configuration setting, or both. In a particular example, multiple vehicles in a fleet are configured to have the same initial adaptive performance metric. The adaptive performance metric adjustment criterion indicates when the adaptive performance metric of the vehicle is to be adjusted.

The vehicle includes a sensor data analyzer configured to update the adaptive performance metric in response to determining that the sensor data (e.g., the second sensor data) satisfies the adaptive performance metric adjustment criterion. To illustrate, continuing the example above, the sensor data analyzer may determine that the sensor data (e.g., the second sensor data) satisfies the adaptive performance metric adjustment criterion in response to determining that the hours of operation of the actuator are greater than an operating hours threshold and that the average time to open is greater than an average time threshold. Other examples are also contemplated. To illustrate, the second sensor data may be compared to a fleet wide average to determine whether to adjust the adaptive performance metric. As another illustrative example, second data from multiple second sensors can be compared to multiple adaptive performance metric adjustment criteria to determine whether to adjust the adaptive performance metric and how to adjust the adaptive performance metric. In this example, results of comparing the second sensor data to the multiple adaptive performance metric adjustment criteria can combined algebraically (e.g., using a weighted sum or weighted average) or logically (e.g., using Boolean operations, such as OR, AND, NOR, etc.) to determine whether and/or how to adjust the adaptive performance metric.

The sensor data analyzer, in response to determining that the sensor data satisfies the adaptive performance metric adjustment criterion, determines (e.g., updates) the adaptive performance metric. How the adaptive performance metric is updated can vary depending on the type of system being evaluated, the data being compared to the adaptive performance metric, and the specific implementation. As a simple example, the adaptive performance metric can have a first pre-determined value (e.g., a first constant value) before the adaptive performance metric adjustment criterion is satisfied and can have a second pre-determined value (e.g., a second constant value) after the adaptive performance metric adjustment criterion is satisfied. In a more complex example, the adaptive performance metric can have a first pre-determined value (e.g., a first constant value) before the adaptive performance metric adjustment criterion is satisfied and can have a variable value after the adaptive performance metric adjustment criterion is satisfied. In this example, the variable value can be calculated based on the first sensor data, the second sensor data, other data, or any combination thereof, after a determination is made that the adaptive performance metric adjustment criterion is satisfied. Alternatively, the variable value can be retrieved from a look-up table or other data structure (e.g., a decision tree, an artificial neural network, or another learning model) after a determination is made that the adaptive performance metric adjustment criterion is satisfied. In a still more complex example, the adaptive performance metric can indicate that the first sensor data is to be compared to a threshold value (e.g., a first constant value or a first variable value) before the adaptive performance metric adjustment criterion is satisfied and indicate that data from one or more other sensors is to be compared to one or more different threshold values (e.g., a set of constant values. a set of variable values, or any combination thereof) after the adaptive performance metric adjustment criterion is satisfied. In this example, the one or more other sensors can include the first sensor (that generates the first sensor data) along with other sensors, or the first sensor can be ignored for purposes of evaluating the adaptive performance metric after the adaptive performance metric adjustment criterion is satisfied.

The sensor data analyzer generates a maintenance alert in response to determining that the sensor data (e.g., the first sensor data) fails to satisfy the adaptive performance metric (e.g., the updated value of the adaptive performance metric). The sensor data analyzer thus adapts the adaptive performance metric based on conditions detected at the vehicle.

FIG. 1 is a block diagram of a system 100 that is operable to perform vehicle anomalous behavior detection. The system 100 includes a vehicle 102 communicatively coupled to (e.g., including) a display 110. The vehicle 102 includes, without limitation, a car, a truck, an aircraft, a boat, a train, an unmanned vehicle, a manned vehicle, or any combination thereof. It should be noted that in the following description, various functions performed by the system 100 of FIG. 1 are described as being performed by certain components or modules. However, this division of components and modules is for illustration only. In an alternate aspect, a function described herein as performed by a particular component or module is divided amongst multiple components or modules. Moreover, in an alternate aspect, two or more components or modules of FIG. 1 are integrated into a single component or module. In a particular aspect, one or more functions described herein as performed by the vehicle 102 are divided amongst multiple devices (e.g., the vehicle 102, a central server, a distributed system, or any combination thereof). Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The vehicle 102 is communicatively coupled to a sensor data analyzer 120, a memory 132, an input interface 128, a display interface 126, a plurality of sensors 160, a plurality of systems (including a system 104), or any combination thereof. In a particular aspect, the vehicle 102 includes the sensor data analyzer 120, the memory 132, the input interface 128, the display interface 126, the plurality of sensors 160, the plurality of systems (including the system 104), or any combination thereof. In a particular aspect, one or more of the sensor data analyzer 120, the memory 132, the input interface 128, the display interface 126, the plurality of sensors 160, or the plurality of systems (including the system 104) is external to (e.g., remotely located from) the vehicle 102. The memory 132 includes volatile memory devices (e.g., random access memory (RAM) devices), nonvolatile memory devices (e.g., read-only memory (ROM) devices, programmable read-only memory, and flash memory), or both. In a particular aspect, the memory 132 includes one or more applications (e.g., instructions) executable by the sensor data analyzer 120 to initiate, control, or perform one or more operations described herein. In an illustrative example, a computer-readable storage device (e.g., the memory 132) includes instructions that, when executed by a processor (e.g., the sensor data analyzer 120), cause the processor to initiate, perform, or control operations described herein.

The display interface 126 is configured to be communicatively coupled to the display 110. In a particular aspect, the display 110 is external to the vehicle 102. In an alternate aspect, the display 110 is internal to the vehicle 102. The input interface 128 is configured to be communicatively coupled to an input device, such as a keyboard, a mouse, a motion sensor, a camera, or a microphone. In a particular example, the input interface 128 is configured to receive user input 147 from a user 101.

The plurality of systems includes the system 104. To illustrate, in various implementations, the system 104 includes an environmental control system (e.g., an air conditioning system), a braking system, a charging system, an actuator, an engine, a starting system, another vehicle system, or any combination thereof. The system 104 includes one or more components. For example, in FIG. 1, the system 104 includes a first component 182, a second component 184, and a third component 186. It should be understood that the system 104 is described as including three components as an illustrative example. In some examples, the system 104 includes fewer than three components, and in other examples, the system 104 includes more than three components. In FIG. 1, the plurality of sensors 160 includes a first sensor 150, a second sensor 152, a third sensor 154, a fourth sensor 156, and a fifth sensor 158. It should be understood that the plurality of sensors 160 is describes as including five sensors as an illustrative example. In some examples, the plurality of sensors 160 includes fewer than five sensors, and in other examples, the plurality of sensors 160 includes more than five sensors.

The plurality of sensors 160 is configured to generate sensor data 149 indicating an operational status of the system 104. For example, the first sensor 150, the second sensor 152, the third sensor 154, the fourth sensor 156, and the fifth sensor 158 are configured to generate first sensor data 151, second sensor data 153, third sensor data 155, fourth sensor data 157, and fifth sensor data 159, respectively. The first sensor data 151, the second sensor data 153, the third sensor data 155, the fourth sensor data 157, the fifth sensor data 159, or any combination thereof, indicate operational status of the first component 182, the second component 184, the third component 186, or any combination thereof.

In a particular aspect, the memory 132 is configured to store a plurality of "execution stacks." An execution stack includes one or more "execution attributes" in a particular order. The particular order indicates a sequence for processing the one or more "execution attributes" by the sensor data analyzer 120. An execution attribute specifies one or more information processing actions, identifies information to be used to perform the one or more information processing actions, or any combination thereof. In a particular implementation, the one or more information processing actions include, without limitation, identifying, receiving, analyzing, changing, storing, and reporting. In some examples, an execution stack includes execution attributes as disclosed in U.S. Pat. No. 9,633,489 ("Schmitz et al."), the entire content of which is incorporated by reference herein.

In a particular example, the memory 132 is configured to store a first execution stack 161, a second execution stack 163, an adaptive performance metric adjustment execution stack 165, an adaptive performance metric execution stack 167, or any combination thereof. It should be understood that the memory 132 is described as being configured to store four execution stacks as an illustrative examples. In some examples, the memory 132 is configured to store fewer than four execution stacks, and in other examples, the memory 132 is configured to store more than four execution stacks.

The first execution stack 161 is executable to determine when to store sensor data in the memory 132. For example, in FIG. 1, the first execution stack 161 includes one or more first execution attributes that indicate a first condition 171, and one or more second execution attributes that indicate that the first sensor data 151 is to be stored in the memory 132 in response to a determination that the first condition 171 is satisfied. The first condition 171 indicates when the first sensor data 151 is to be stored in the memory 132. In this example, the first condition 171 may be satisfied based on a value of the first sensor data 151, a time since prior sensor data was stored in the memory 132, a time since the system 100 was initialized or turned on, a value of other sensor data (e.g. a value of the fifth sensor data 159), etc. Similarly, in FIG. 1, the second execution stack 163 includes one or more third execution attributes that indicate a second condition 173, and one or more fourth execution attributes that indicate that the second sensor data 153 is to be stored in the memory 132 in response to a determination that the second condition 173 is satisfied. The second condition 173 indicates when the second sensor data 153 is to be stored in the memory 132. The adaptive performance metric adjustment execution stack 165 includes one or more fifth execution attributes indicating an adaptive performance metric adjustment criterion 135, and one or more sixth execution attributes indicating how the adaptive performance metric 137 is to be updated in response to a determination that the adaptive performance metric adjustment criterion 135 is satisfied. The adaptive performance metric adjustment criterion 135 indicates when the adaptive performance metric 137 is to be updated. The adaptive performance metric execution stack 167 includes one or more seventh execution attributes indicating the adaptive performance metric 137, and one or more eighth execution attributes that indicate that a maintenance alert 139 is to be generated in response to a determination that the adaptive performance metric 137 is not satisfied.

It should be understood that although each of the first execution stack 161, the second execution stack 163, the adaptive performance metric adjustment execution stack 165, and the adaptive performance metric execution stack 167 is described as a single execution stack, in some implementations one or more of the first execution stack 161, the second execution stack 163, the adaptive performance metric adjustment execution stack 165, or the adaptive performance metric execution stack 167 corresponds to multiple execution stacks. In a particular example, the adaptive performance metric adjustment execution stack 165 corresponds to a first execution stack including the one or more fifth execution attributes and a second execution stack including one or more sixth execution attributes. The sensor data analyzer 120 executes the second execution stack in response to determining that the adaptive performance metric adjustment criterion 135 indicated by the first execution stack is satisfied. Similarly, in a particular example, the adaptive performance metric execution stack 167 corresponds to a first particular execution stack including the one or more seventh execution attributes and a second particular execution stack including one or more eighth execution attributes. The sensor data analyzer 120 executes the second particular execution stack in response to determining that the adaptive performance metric 137 indicated by the first particular execution stack is not satisfied.

In a particular implementation, the sensor data analyzer 120 places the first execution attributes, the third execution attributes, the fifth execution attributes, and the seventh execution attributes along with the corresponding second execution attributes, the fourth execution attributes, the sixth execution attributes, and the eighth execution attributes in separate processing queues. The sensor data analyzer 120 processes the first execution attributes, the third execution attributes, the fifth execution attributes, and the seventh execution attributes automatically to determine whether the first condition 171, the second condition 173, the adaptive performance metric adjustment criterion 135, and the adaptive performance metric 137, respectively, are satisfied. The sensor data analyzer 120, in response to determining that at least one of the first condition 171, the second condition 173, the adaptive performance metric adjustment criterion 135, or the adaptive performance metric 137 is determined to be satisfied, processes the corresponding second execution attributes, the fourth execution attributes, the sixth execution attributes, and/or the eighth execution attributes. In a particular example, the sensor data analyzer 120 executes multiple execution stacks in response to detecting an update in the data from a plurality of the sensors 160. In a particular example, multiple execution stacks depend on data from a single sensor and the sensor data analyzer 120 executes the multiple execution stacks in response to detecting an update in the data from the single sensor.

In a particular aspect, the memory 132 stores a processing attribute (e.g., a configuration setting, a default value, or both) indicating when an execution attribute (e.g., the first execution attributes, the third execution attributes, and the fifth execution attributes) in each of the processing queues is to be processed. Alternatively, the memory 132 stores a processing attribute associated with particular execution attributes (e.g., the first execution attributes, the third execution attributes, or the fifth execution attributes) indicating when the particular execution attributes are to be processed.

In a particular implementation, new execution attributes can be generated to implement a change to information processing onboard the vehicle 102. For example, new execution attributes define a number of new information processing actions to be performed by the sensor data analyzer 120 running on the vehicle 102 without changing the sensor data analyzer 120 on the vehicle 102. The new execution attributes can be loaded onto the vehicle 102 by adding the new execution attributes to execution attributes already in one or more of the execution stacks 161-167, by modifying execution attributes already in one or more of the execution stacks 161-167, or both. For example, the user 101 could provide user input 147 to update the adaptive performance metric adjustment criterion 135, the first condition 171, the second condition 173, or any combination thereof. In a particular aspect, the sensor data analyzer 120 determines (e.g., updates) the adaptive performance metric adjustment criterion 135 based on a look-up table or other data structure (e.g., a decision tree, an artificial neural network, or another learning model). In a particular aspect, a processor of the vehicle 102 updates one or more of the execution attributes of the execution stacks 161-167 (e.g., the adaptive performance metric adjustment criterion 135, the adaptive performance metric 137, the first condition 171, the second condition 173, or any combination thereof) in response to receiving a request from another device (e.g., a maintenance device).

The sensor data analyzer 120 is configured to update the sensor data 149 in the memory 132 in response to determining whether one or more conditions are satisfied. For example, the sensor data analyzer 120 is configured to update the sensor data 149 in the memory 132 to include the first sensor data 151 in response to determining that the first condition 171 is satisfied. As another example, the sensor data analyzer 120 is configured to update the sensor data 149 in the memory 132 to include the second sensor data 153 in response to determining that the second condition 173 is satisfied.

The sensor data analyzer 120 is configured to determine (e.g., update) the adaptive performance metric 137 in response to determining, based on the sensor data 149, that the adaptive performance metric adjustment criterion 135 is satisfied. In a particular aspect, the system 104 is of a first system type (e.g., a braking system, a navigation system, etc.). Generally, multiple vehicles of a fleet of vehicles include systems of the first system type. In a particular implementation, an initial value of the adaptive performance metric 137 is based on operation of a plurality of systems corresponding to the vehicles of the fleet. For example, the vehicle fleet includes the vehicle 102, a second vehicle, and one or more additional vehicles. In this example, the vehicle 102 includes the system 104 of the first system type, the second vehicle includes a second system of the first system type, and so on. Further, in this example, the vehicle 102 and the second vehicle include the same initial value for the adaptive performance metric 137 associated with the system 104 and the second system, respectively. The initial value can be based, for example, on an expected operating environment of the vehicles, historical data, manufacturer recommendations, etc.

The sensor data analyzer 120 is configured to update the adaptive performance metric adjustment criterion 135, the adaptive performance metric 137, or both, based on conditions (e.g., the sensor data 149) detected at the vehicle 102 over time. The sensor data analyzer 120 is also configured to generate the maintenance alert 139 in response to determining that the sensor data 149 fails to satisfy the adaptive performance metric 137. The sensor data analyzer 120 thus generates the maintenance alert 139 based on the adaptive performance metric 137 that is adapted to conditions detected at the vehicle 102.

During operation, the sensors 160 generate the first sensor data 151, the second sensor data 153, the third sensor data 155, the fourth sensor data 157, the fifth sensor data 159, or any combination thereof. In various non-limiting examples, one or more of the first component 182, the second component 184, or the third component 186 include a stabilizer, a rudder, an elevator, an exhaust nozzle, a flight data recorder, a cockpit voice recorder, a pressure valve, a wing, an aileron, a tail, a lift control device, a flap, a slat, a spoiler, a propeller, a propulsion device, an engine, an intake valve, a fan, a compressor, a combustion chamber, a turbine, a landing gear, a nose gear, a main gear, a cockpit, a navigation device, an information device, a communication device, a hydraulic system, an electric system, a pneumatic system, a light, a fuel vent, an air duct, an accessory belt, a camshaft, a connecting rod, an actuator, a door, a window, a windshield, a gauge, a meter, an ignition system, wiring, a brake, a brake pad, a brake plate, a brake disc, a distributor, a radiator, an oil filter, an oil gasket, or another vehicle component.

In a particular example, the first sensor data 151 indicates when the first component 182 transitions from a first state to a second state. To illustrate, if the first component 182 is an actuator, the first sensor data 151 indicates when the actuator transitions from a closed state to an open state or from an open state to a closed state. The first sensor 150 detects the first component 182 transitioning from the first state at a first time to the second state at a second time. In a particular example, the third sensor 154 generates the third sensor data 155 having a first value (e.g., 0) while the first component 182 is in the first state (e.g., a closed state), a second value (e.g., 1) while the first component 182 is in an intermediate state (e.g., a transitioning state), and a third value (e.g., 2) while the first component 182 is in the second state (e.g., an open state). The first sensor 150 detects that the third sensor data 155 transitions, at the first time, from the first value (e.g., 0) to the intermediate value (e.g., 1). The first sensor 150 detects that the third sensor data 155 transitions, at the second time, from the intermediate value (e.g., 1) to the second value (e.g., 2). The first sensor 150, in response to determining that the third sensor data 155 indicates that the first component 182 transitioned from the first state to the second state, generates the first sensor data 151 indicating a measured transition time (e.g., a measured time to open) based on a difference between the first time and the second time. In a particular aspect, the first sensor data 151 indicates that the first time corresponds to the first state, that the second time corresponds to the second state, that the measured transition time corresponds to the difference between the first time and the second time, or any combination thereof.

In a particular non-limiting example, the second sensor 152 counts operations cycles or state changes of the first component 182. In this example, the second sensor 152 detects, at a first time, that the third sensor data 155 transitions from the first value (e.g., 0) to the intermediate value (e.g., 1). The second sensor 152 detects, at a second time, that the third sensor data 155 transitions from the intermediate value (e.g., 1) to the second value (e.g., 2). In this example, the second sensor 152 increments a count based on detecting the change from the first value (e.g., 0) to the third value (e.g., 2). Alternatively, the second sensor 152 can include one or more limit switches that are used to count cycles or state changes of the first component 182.

In a particular implementation, the sensor data analyzer 120 stores an average transition time in a first register (or another portion of the memory 132) and a count of transitions in a second register (or another portion of the memory 132). In this implementation, the sensor data analyzer 120 determines the average transition time based on Equation 1:

$$\text{Ave. Transition Time}_{N+1} = \frac{(\text{Ave. Transition Time}_N * \text{Transition Count}_N) + \text{Measured Transition Time}}{\text{Transition Count}_N + 1}$$

where "Ave. Transition Time$_{N+1}$" corresponds to the updated value of the average transition time, "Ave. Transition Time$_N$" corresponds to the previous value of the average transition time, and "Transition Count$_N$" corresponds to the previous value of the count of transitions. As an example, the sensor data analyzer 120, in response to receiving the second sensor data 153, updates the average time to transition based on Equation 1 and updates (e.g., increments by 1) the count of transitions in the memory 132.

In a particular aspect, the sensor data analyzer 120 determines whether the first condition 171 is satisfied, e.g., in response to receiving the first sensor data 151. For example, the sensor data analyzer 120 executes the first execution attributes of the first execution stack 161 to determine whether the sensor data 149 satisfies the first condition 171. To illustrate, the sensor data analyzer 120 determines that the first condition 171 is satisfied in response to determining that the third sensor data 155 indicates that the first component 182 (e.g., the actuator) transitioned from the first state (e.g., a closed state) to the second state (e.g., an open state). The sensor data analyzer 120, in response to determining that the first condition 171 is satisfied, executes the second execution attributes of the first execution stack 161 to store (e.g., update) the first sensor data 151 (e.g., indicating the measured time to transition or the measured time to open) in the memory 132. Alternatively, the sensor data analyzer 120, in response to determining that the first condition 171 is not satisfied, refrains from executing the second execution attributes. For example, the sensor data analyzer 120, in response to determining that the first condition 171 is not satisfied, refrains from storing (or updating) the first sensor data 151 in the memory 132.

In a particular aspect, the sensor data analyzer 120 determines whether the second condition 173 is satisfied, e.g., in response to receiving the second sensor data 153. For example, the sensor data analyzer 120 executes the third execution attributes of the second execution stack 163 to determine whether the sensor data 149 satisfies the second condition 173. To illustrate, the sensor data analyzer 120 determines that the second condition 173 is satisfied in response to determining that the third sensor data 155 indicates that the first component 182 (e.g., the actuator) transitioned from the first state (e.g., a closed state) to the second state (e.g., an open state). The sensor data analyzer 120, in response to determining that the second condition 173 is satisfied, executes the fourth execution attributes of the second execution stack 163 to store (e.g., update) the second sensor data 153 (e.g., indicating the measured time to transition, the count of transitions, the average transition time, or any combination thereof) in the memory 132. Alternatively, the sensor data analyzer 120, in response to determining that the second condition 173 is not satisfied, refrains from executing the fourth execution attributes. For example, the sensor data analyzer 120, in response to determining that the second condition 173 is not satisfied, refrains from storing (or updating) the second sensor data 153 in the memory 132. In a particular aspect, the first sensor 150 is the same as the second sensor 152. In an alternative aspect, the first sensor 150 is distinct from the second sensor 152.

The sensor data analyzer 120 determines whether the adaptive performance metric adjustment criterion 135 is satisfied, e.g., in response to determining that the sensor data 149 (on which the adaptive performance metric adjustment criterion 135 is dependent) is stored (e.g., updated) in the memory 132. The sensor data analyzer 120 determines that the sensor data 149 is updated in the memory 132 in response to storing a value based on the first sensor data 151, the second sensor data 153, the third sensor data 155, the fourth sensor data 157, the fifth sensor data 159, or any combination thereof, is stored (e.g., updated) in the memory 132. In a particular example, the sensor data analyzer 120 executes the fifth execution attributes of the adaptive performance metric adjustment execution stack 165 to determine whether the sensor data 149 satisfies the adaptive performance metric adjustment criterion 135. To illustrate, the second sensor data 153 indicates a first operation condition (e.g., hours of operation) of the first component 182, a second operation condition (e.g., the average time to transition or the average time to open the actuator) of the first component 182, or both. The adaptive performance metric adjustment criterion 135 indicates a first operation threshold (e.g., 100 hours), a second operation threshold (e.g., an average time threshold), or both.

In an illustrative implementation, the sensor data analyzer 120 determines hours of operation of the system 104 or one of the components 182-186 based on the fourth sensor data 157. In a particular aspect, the sensor data analyzer 120 receives the fourth sensor data 157 (e.g., a first timestamp) from the fourth sensor 156 (e.g., a clock). The sensor data analyzer 120 determines the hours of operation based on the fourth sensor data 157, such as a difference between the first timestamp and a second timestamp, where the second timestamp indicates an installation time of one of the components 182-186 or the system 104. In an alternative aspect, the fourth sensor 156 determines the fourth sensor data 157 based on the difference between the first stamp and the second timestamp and provides the fourth sensor data 157 as the hours of operation to the sensor data analyzer 120.

In a particular example, the adaptive performance metric 137 indicates a metric threshold (e.g., a predicted transition time or a predicted time to open). In this example, the sensor data analyzer 120 determines the average time threshold based on the metric threshold (e.g., average time threshold=0.95*metric threshold). As a specific example, the sensor data analyzer 120 can determine that the second sensor data 153 satisfies the adaptive performance metric adjustment criterion 135 in response to determining that a first operating condition (e.g., a number of hours of operation) is greater than a first operation threshold (e.g., 100 hours), that a second operating condition (e.g., the average time to transition or the average time to open the actuator) is greater than the second operation threshold (e.g., an average time threshold), or both.

In a particular aspect, the sensor data analyzer 120 determines whether the adaptive performance metric adjustment criterion 135 is satisfied based on sensor data from multiple sensors. For example, the sensor data analyzer 120 determines whether the second sensor data 153 and the fifth sensor data 159 satisfy the adaptive performance metric adjustment criterion 135. In a particular aspect, the sensor data analyzer 120 determines whether the adaptive performance metric adjustment criterion 135 is satisfied based at least in part on sensor data from a sensor associated with another component of the system 104 or of another component of another system. For example, the fifth sensor 158 generates the fifth sensor data 159 indicating an operational status of the second component 184, and the sensor data analyzer 120 determines whether the second sensor data 153 and the fifth sensor data 159 satisfy the adaptive performance metric adjustment criterion 135, where the adaptive performance metric 137 is associated with the first component 182.

The sensor data analyzer 120 determines (e.g., updates) the adaptive performance metric 137 in response to determining that the adaptive performance metric adjustment criterion 135 is satisfied. For example, the sensor data analyzer 120, in response to determining that the adaptive performance metric adjustment criterion 135 is satisfied, executes the sixth execution attributes of the adaptive performance metric adjustment execution stack 165 to determine (e.g., update) the adaptive performance metric 137. In a particular aspect, the sensor data analyzer 120 determines (e.g., updates) the adaptive performance metric 137 to have a pre-determined value (e.g., a constant value). In a more complex example, the sensor data analyzer 120 determines (e.g., updates) the adaptive performance metric 137 to have a variable value. The variable value can be calculated based on the sensor data 149. In a particular implementation, the variable value can be retrieved from a look-up table or other data structure (e.g., a decision tree, an artificial neural network, or another learning model). In a still more complex example, the sensor data analyzer 120 determines (e.g., updates) the adaptive performance metric 137 to indicate that the sensor data 149 (or a portion thereof) is to be compared to one or more different threshold values (e.g., a set of constant values. a set of variable values, or any combination thereof).

In a particular example, the adaptive performance metric 137 indicates a metric threshold (e.g., the predicted transition time or the predicted time to open), a fault factor (e.g., a tolerance factor, such as 1 ms), or both. In this example, the sensor data analyzer 120, in response to determining that the adaptive performance metric adjustment criterion 135 is satisfied, updates the metric threshold, the fault factor, or both. As a specific non-limiting example, the metric threshold is the predicted time to open, and the sensor data analyzer 120 updates the metric threshold based on the average time to transition (e.g., updated value of the predicted time to open=0.5*(previous value of the predicted time to open+average time to transition)). In this specific example, the sensor data analyzer 120 updates the fault factor based on the count of transitions (e.g., fault factor=1+(count of transitions/1000)). Alternatively, the sensor data analyzer 120, in response to determining that the sensor data 149 fails to satisfy the adaptive performance metric adjustment criterion 135, refrains from executing the sixth execution attributes of the adaptive performance metric adjustment execution stack 165. For example, the sensor data analyzer 120, in response to determining that the sensor data 149 fails to satisfy the adaptive performance metric adjustment criterion 135, determines that the adaptive performance metric 137 is not to be updated and refrains from updating the adaptive performance metric 137.

The sensor data analyzer 120 determines whether the sensor data 149 satisfies the adaptive performance metric 137, e.g., subsequent to updating the adaptive performance metric 137 or subsequent to determining that the adaptive performance metric 137 is not to be updated. For example, the sensor data analyzer 120 executes the seventh execution attributes of the adaptive performance metric execution stack 167 to determine whether the adaptive performance metric 137 is satisfied. To illustrate, the sensor data analyzer 120 determines that the sensor data 149 satisfies the adaptive performance metric 137 in response to determining that the first sensor data 151 satisfies (e.g., is one of less than, less than or equal to, greater than, or greater than or equal to) the adaptive performance metric 137.

In a specific example, the sensor data analyzer 120 generates the maintenance alert 139 in response to determining that the sensor data 149 fails to satisfy the adaptive performance metric 137. For example, the sensor data analyzer 120, in response to determining that the sensor data 149 fails to satisfy the adaptive performance metric 137, executes the eighth execution attributes of the adaptive performance metric execution stack 167 to generate the maintenance alert 139. The maintenance alert 139 indicates a request for performance of a maintenance action associated with one or more of the sensors 160, the system 104, the first component 182, or any combination thereof. In a particular aspect, the sensor data analyzer 120 generates a GUI 141 indicating the maintenance alert 139 and provides the GUI 141 to the display 110. The sensor data analyzer 120 stores the GUI 141, the maintenance alert 139, or both, in the memory 132. In a particular aspect, the sensor data analyzer 120 provides (e.g., transmits) the maintenance alert 139 to a maintenance server, a communication device, a fleet management device, or any combination thereof. A repair technician (e.g., the user 101) could perform maintenance of the vehicle 102 based on the GUI 141, the maintenance alert 139, or both. Alternatively, the sensor data analyzer 120 refrains from generating the maintenance alert 139 in response to determining that the sensor data 149 satisfies the adaptive performance metric 137. For example, the sensor data analyzer 120 refrains from executing the eighth execution attributes in response to determining that the sensor data 149 satisfies the adaptive performance metric 137.

The system 100 thus enables adjusting the adaptive performance metric 137 based on conditions detected at the vehicle 102. The adaptive performance metric 137 evolves to account for the various conditions experienced by the vehicle 102 that could differ from another set of conditions experienced by another vehicle. For example, under a first set of conditions (e.g., a newer actuator), the maintenance alert 139 is generated if the measured time to transition (e.g., the measured time to open) from a first state to a second state of the first component 182 fails to satisfy an initial value of the adaptive performance metric. Under a second set of conditions (e.g., an older actuator), the sensor data analyzer 120 updates the adaptive performance metric 137 and the maintenance alert 139 is generated if the measured time to transition fails to satisfy the updated value of adaptive performance metric 137.

Figure 2:
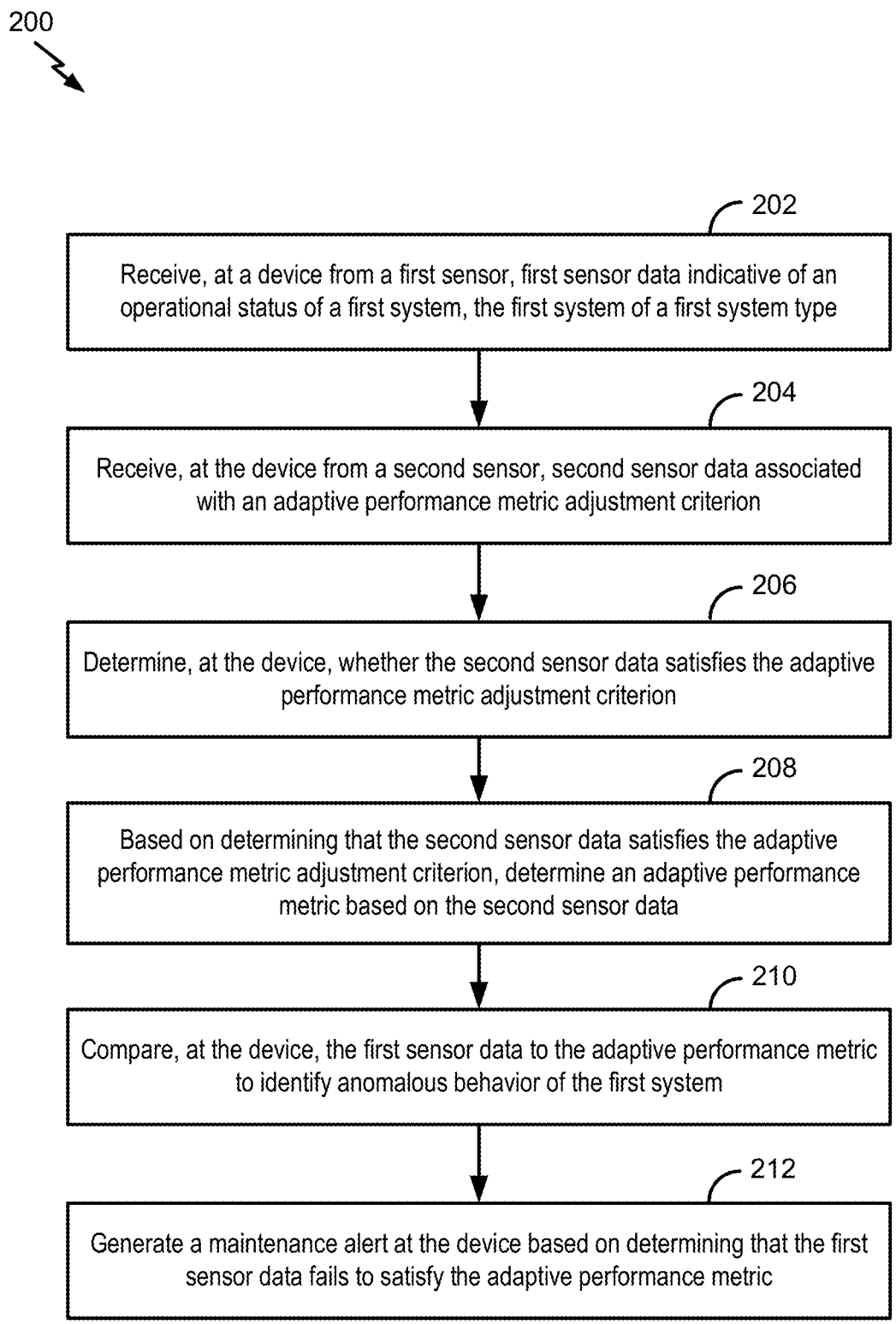
FIG. 2 is a flow chart of an example of a method of detecting anomalous behavior of a vehicle.

FIG. 2 is a flowchart of a method 200 of performing vehicle anomalous behavior detection. The method 200 may be performed by the sensor data analyzer 120, the vehicle 102, the system 100 of FIG. 1, or any combination thereof.

The method 200 includes receiving, at a device from a first sensor, first sensor data indicative of an operational status of a first system (of a first system type), at 202. For example, the sensor data analyzer 120 of FIG. 1 receives the first sensor data 151 from the first sensor 150, as described with reference to FIG. 1. The first sensor data 151 is indicative of an operation status of the system 104 of FIG. 1. To illustrate, in a non-limiting example, the first sensor data 151 indicates a measured time to time to transition from a first state of the first component 182 to a second state of the first component 182, as described with reference to FIG. 1.

The method 200 also includes receiving, at the device from a second sensor, second sensor data associated with an adaptive performance metric adjustment criterion, at 204. For example, the sensor data analyzer 120 of FIG. 1 receives the second sensor data 153 from the second sensor 152, as described with reference to FIG. 1. The second sensor data 153 is associated with the adaptive performance metric adjustment criterion 135.

The method 200 further includes determining, at the device, whether the second sensor data satisfies the adaptive performance metric adjustment criterion, at 206. For example, the sensor data analyzer 120 of FIG. 1 determines whether the second sensor data 153 satisfies the adaptive performance metric adjustment criterion 135, as described with reference to FIG. 1. To illustrate, the sensor data analyzer 120 executes the fifth execution attributes of the adaptive performance metric adjustment execution stack 165 to determine whether the second sensor data 153 satisfies the adaptive performance metric adjustment criterion 135, as described with reference to FIG. 1.

The method 200 also includes, based on determining that the second sensor data satisfies the adaptive performance metric adjustment criterion, determining an adaptive performance metric based on the second sensor data, at 208. For example, the sensor data analyzer 120 of FIG. 1, based on determining that the second sensor data 153 satisfies the adaptive performance metric adjustment criterion 135, determines (e.g., updates) the adaptive performance metric 137 based on the second sensor data 153, as described with reference to FIG. 1. To illustrate, the sensor data analyzer 120, in response to determining that the second sensor data 153 satisfies the adaptive performance metric adjustment criterion 135, executes the sixth execution attributes of the adaptive performance metric adjustment execution stack 165 to determine (e.g., update) the adaptive performance metric 137, as described with reference to FIG. 1.

The method 200 further includes comparing, at the device, the first sensor data to the adaptive performance metric to identify anomalous behavior of the first system, at 210. For example, the sensor data analyzer 120 of FIG. 1 compares the first sensor data 151 to the adaptive performance metric 137 to identify anomalous behavior of the system 104. To illustrate, the sensor data analyzer 120, in response to determining that the first sensor data 151 fails to satisfy the adaptive performance metric 137, determines that anomalous behavior is detected at at least one of the sensors 160, the first component 182, or the system 104. In a particular aspect, the sensor data analyzer 120 executes the seventh execution attributes of the adaptive performance metric execution stack 167 to determine whether the first sensor data 151 satisfies the adaptive performance metric 137, as described with reference to FIG. 1. The sensor data analyzer 120, in response to determining that the first sensor data 151 fails to satisfy the adaptive performance metric 137, determines that anomalous behavior is detected at at least one of the sensors 160, the first component 182, or the system 104.

The method 200 also includes generating a maintenance alert at the device based on determining that the first sensor data fails to satisfy the adaptive performance metric, at 212. For example, the sensor data analyzer 120 of FIG. 1 generates the maintenance alert 139 based on determining that the first sensor data 151 fails to satisfy the adaptive performance metric 137, as described with reference to FIG. 1. To illustrate, the sensor data analyzer 120, based on determining that the first sensor data 151 fails to satisfy the adaptive performance metric 137, executes the eighth execution attributes of the adaptive performance metric execution stack 167 to generate the maintenance alert 139, as described with reference to FIG. 1.

The method 200 thus enables determining an adaptive performance metric based on sensor data indicating detected conditions. A maintenance alert is generated based on the adaptive performance metric.

Figure 3:
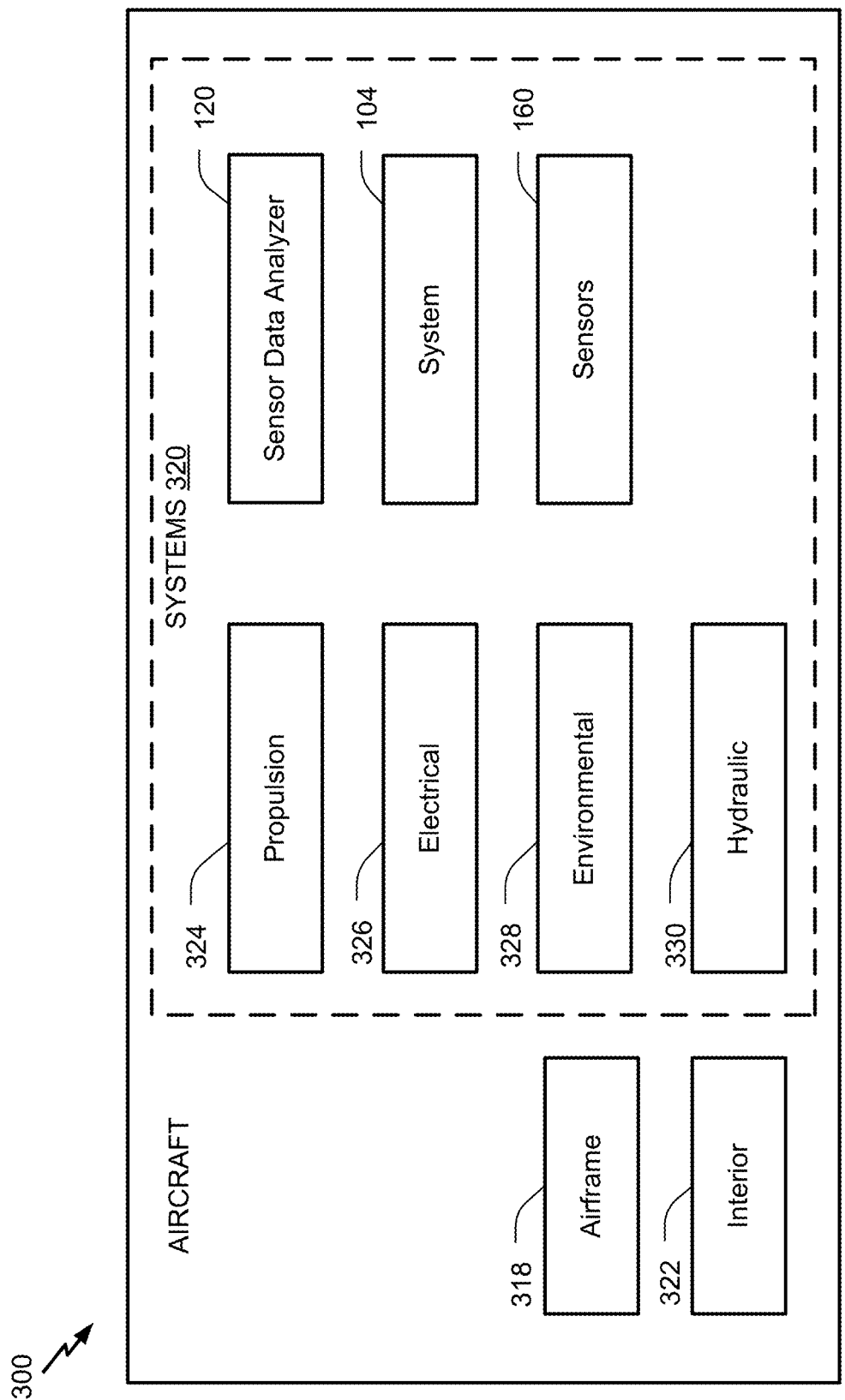
FIG. 3 is an illustration of a block diagram of a vehicle configured to support aspects of computer-implemented methods and computer-executable program instructions (or code) according to the present disclosure.

Aspects of the disclosure may be described in the context of an aircraft 300 as shown in FIG. 3. The aircraft 300 includes an airframe 318 with a plurality of systems 320 (e.g., high-level systems) and an interior 322. Examples of the systems 320 include one or more of a propulsion system 324, an electrical system 326, an environmental system 328, an hydraulic system 330, the sensor data analyzer 120, the system 104, or the sensors 160. Other systems could also be included. Although the system 104 is illustrated as a separate system, in other implementations, the system 104 encompasses or is included within one or more of the systems 324-330.

The sensor data analyzer 120 is configured to support aspects of computer-implemented methods and computer-executable program instructions (or code) according to the present disclosure. For example, the sensor data analyzer 120, or portions thereof, is configured to execute instructions to initiate, perform, or control one or more operations described with reference to FIGS. 1-3. Although an aerospace example is shown, the present disclosure can be applied to other industries. For example, the system 104, the sensors 160, and the sensor data analyzer 120 can be used onboard a manned or unmanned vehicle (such as a satellite, a watercraft, or a land-based vehicle), in a building or other structure.

Although one or more of FIGS. 1-3 illustrate systems, apparatuses, and/or methods according to the teachings of the disclosure, the disclosure is not limited to these illustrated systems, apparatuses, and/or methods. One or more functions or components of any of FIGS. 1-3 as illustrated or described herein may be combined with one or more other portions of another of FIGS. 1-3. For example, one or more elements of the method 200 of FIG. 2 may be performed in combination with other operations described herein. Accordingly, no single implementation described herein should be construed as limiting and implementations of the disclosure may be suitably combined without departing form the teachings of the disclosure. As an example, one or more operations described with reference to FIGS. 1-2 may be optional, may be performed at least partially concurrently, and/or may be performed in a different order than shown or described.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A vehicle comprising:
a first sensor configured to generate first sensor data indicative of an operational status of a system of a specified system type;
a second sensor configured to generate second sensor data associated with an adaptive performance metric adjustment criterion;
a memory configured to store the first sensor data and the second sensor data during one or more operational periods of the vehicle; and
a processor configured to:
determine whether the second sensor data satisfies the adaptive performance metric adjustment criterion;
in response to determining that the second sensor data satisfies the adaptive performance metric adjustment criterion, selectively determine, based on the second sensor data, an adaptive performance metric to be compared to the first sensor data to identify anomalous behavior of the system;
compare the first sensor data to the adaptive performance metric; and
in response to determining that the first sensor data fails to satisfy the adaptive performance metric, generate a maintenance alert.

2. The vehicle of claim 1, wherein the memory is further configured to store a first execution stack indicating a first condition, and wherein the processor is further configured to, in response to determining that the first condition is satisfied, store the first sensor data in the memory.

3. The vehicle of claim 1, wherein the memory is further configured to store a second execution stack indicating a second condition, and wherein the processor is further configured to, in response to determining that the second condition is satisfied, store the second sensor data in the memory.

4. The vehicle of claim 1, wherein the memory is further configured to store an adaptive performance metric adjustment execution stack indicating the adaptive performance metric adjustment criterion.

5. The vehicle of claim 1, further comprising a third sensor configured to generate third sensor data, wherein the processor is configured to update the adaptive performance metric further based on determining whether the third sensor data satisfies the adaptive performance metric adjustment criterion.

6. The vehicle of claim 1, wherein the processor is configured to determine whether the second sensor data satisfies the adaptive performance metric in response to detecting that the second sensor data is stored to the memory.

7. The vehicle of claim 1, wherein the adaptive performance metric is based on operation of a plurality of systems of the specified system type, and wherein a vehicle fleet comprises the plurality of systems.

8. The vehicle of claim 1, wherein the system comprises an actuator, wherein the first sensor data indicates a measured time to open the actuator, wherein the adaptive performance metric indicates a predicted time to open the actuator, and wherein the second sensor data indicates a count of transitions of the actuator from a closed state to an open state.

9. The vehicle of claim 1, wherein the system, the first sensor, the second sensor, the memory, and the processor are integrated into at least one of an aircraft, a boat, a train, or a truck.

10. The vehicle of claim 1, wherein the maintenance alert indicates a request for performance of a maintenance action associated with the first sensor, the second sensor, the system, or any combination thereof.

11. A method comprising:
receiving, at a device from a first sensor, first sensor data indicative of an operational status of a system, the system of a specified system type;
receiving, at the device from a second sensor, second sensor data associated with an adaptive performance metric adjustment criterion;
determining, at the device, whether the second sensor data satisfies the adaptive performance metric adjustment criterion;
based on determining that the second sensor data satisfies the adaptive performance metric adjustment criterion, selectively determining an adaptive performance metric based on the second sensor data;
comparing, at the device, the first sensor data to the adaptive performance metric to identify anomalous behavior of the system; and
generating a maintenance alert at the device based on determining that the first sensor data fails to satisfy the adaptive performance metric.

12. The method of claim 11, further comprising storing, based on determining that a condition is satisfied, the first sensor data in a memory.

13. The method of claim 12, wherein an execution stack stored in the memory indicates the condition.

14. The method of claim 11, further comprising storing, based on determining that a condition is satisfied, the second sensor data in a memory, wherein an execution stack stored in the memory indicates the condition.

15. The method of claim 11, further comprising receiving a plurality of sensor data from a plurality of sensors, the plurality of sensors comprising the second sensor, wherein the adaptive performance metric is based on the plurality of sensor data in response to determining that the plurality of sensor data satisfies the adaptive performance metric adjustment criterion.

16. A computer-readable storage device storing instructions that, when executed by a processor, cause the processor to perform operations comprising:
receiving, from a first sensor, first sensor data indicative of an operational status of a system, the system of a specified system type;
receiving, from a second sensor, second sensor data associated with an adaptive performance metric adjustment criterion;
determining whether the second sensor data satisfies the adaptive performance metric adjustment criterion;
based on determining that the second sensor data satisfies the adaptive performance metric adjustment criterion, selectively determining an adaptive performance metric based on the second sensor data;
comparing the first sensor data to the adaptive performance metric to identify anomalous behavior of the system; and
generating a maintenance alert based on determining that the first sensor data fails to satisfy the adaptive performance metric.

17. The computer-readable storage device of claim 16, wherein the system comprises an actuator, wherein the first sensor data indicates a measured time to open the actuator, wherein the adaptive performance metric indicates a predicted time to open the actuator, and wherein the second sensor data indicates a count of transitions of the actuator from a closed state to an open state and an average time to open the actuator.

18. The computer-readable storage device of claim 17, wherein the operations further comprise, based at least in part on determining that the average time is greater than a time threshold, determining that the second sensor data satisfies the adaptive performance metric adjustment criterion, the time threshold based on the predicted time to open the actuator.

19. The computer-readable storage device of claim 17, wherein the operations further comprise, in response to determining that the second sensor data fails to satisfy the adaptive performance metric adjustment criterion, refraining from determining the adaptive performance metric.

20. The computer-readable storage device of claim 17, wherein the operations further comprise, in response to determining that the second sensor data satisfies the adaptive performance metric adjustment criterion, determining the adaptive performance metric based on the count of transitions, the average time, the predicted time to open the actuator, or any combination thereof.

* * * * *